(12) United States Patent
Gaskill

(10) Patent No.: US 8,422,380 B2
(45) Date of Patent: Apr. 16, 2013

(54) DYNAMICALLY RECONFIGURABLE WIRED NETWORK

(75) Inventor: Garold B. Gaskill, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2094 days.

(21) Appl. No.: 10/401,092

(22) Filed: Mar. 26, 2003

(65) Prior Publication Data

US 2004/0190460 A1    Sep. 30, 2004

(51) Int. Cl.
H04L 12/28    (2006.01)

(52) U.S. Cl.
USPC ............................. 370/252; 370/257; 370/402

(58) Field of Classification Search .................... None
See application file for complete search history.

(56) References Cited

U.S. PATENT DOCUMENTS

| | | | |
|---|---|---|---|
| 4,991,184 A | 2/1991 | Hashimoto | |
| 5,465,399 A | 11/1995 | Oberholtzer et al. | |
| 5,491,837 A | 2/1996 | Haartsen | |
| 5,515,378 A | 5/1996 | Roy, III et al. | |
| 5,535,238 A | 7/1996 | Schilling et al. | |
| 5,631,921 A | 5/1997 | Schilling et al. | |
| 5,682,382 A | 10/1997 | Shepard | |
| 5,722,051 A | 2/1998 | Agrawal | |
| 5,909,649 A | 6/1999 | Saunders | |
| 6,047,189 A | 4/2000 | Yun et al. | |
| 6,957,169 B1* | 10/2005 | Van Horne | 702/182 |
| 6,985,456 B2* | 1/2006 | Gaskill et al. | 370/318 |
| 6,988,212 B1* | 1/2006 | Hamdi | 713/310 |
| 7,321,580 B1* | 1/2008 | Ramanathan et al. | 370/339 |
| 7,406,094 B2* | 7/2008 | Propp et al. | 370/449 |
| 2003/0123404 A1* | 7/2003 | Kasapi et al. | 370/329 |
| 2003/0169700 A1* | 9/2003 | Nilsson | 370/318 |
| 2003/0184433 A1* | 10/2003 | Zalitzky et al. | 340/310.06 |
| 2004/0143428 A1* | 7/2004 | Rappaport et al. | 703/22 |

* cited by examiner

Primary Examiner — Marcus R Smith
(74) Attorney, Agent, or Firm — Austin Rapp & Hardman

(57) ABSTRACT

The invention is directed to a dynamically reconfigurable network comprising a plurality of nodes having respective transmitters and receivers for transmitting and receiving respective signals to and from one another. In one embodiment, the network is adapted to determine whether a first maximum power can be found at which a first node can transmit a first signal that provides a minimum signal-to-noise ratio at a second node without exceeding a maximum signal-to-noise ratio that a third node requires to simultaneously receive a second signal from a fourth node. If the first maximum power cannot be found, the network is further adapted to cause the first, second, third, and fourth nodes to share a single sub-network. Alternatively, if the first maximum power can be found, the network is adapted to cause the first and second nodes to share a single sub-network that the third node is not permitted to share.

40 Claims, 8 Drawing Sheets

DYNAMICALLY RECONFIGURABLE WIRED NETWORK

FIELD OF THE INVENTION

The present invention relates to a dynamically reconfigurable wired network. More particularly, the invention relates to a dynamically reconfigurable wired network making use of the wiring employed in a structure for distributing electrical power.

BACKGROUND

Networks may be classified according to whether the nodes are linked to one another using point-to-point connections or by a broadcast channel. In point-to-point networks, there are many links with each link connecting a single pair of nodes. Nodes sharing a point-to-point link may transmit directly to one another and nodes that do not share a point-to-point link may communicate by sending their message via one or more intermediate nodes. In broadcast networks, all of the nodes are linked together and share a single communication channel over which all messages are broadcast. Each broadcast message typically includes an address, which identifies the intended recipient. When a node receives a message, it checks the address to see if it is the intended recipient and if the message is for the receiving node, it processes the message. If the message is addressed to another node, the receiving node discards the message. An inherent problem in many broadcast networks is channel allocation, i.e., determining which node gets access to the communication channel when two or more nodes want to use it at the same time.

Two methods that have been used in protocols that address the channel allocation problem are "carrier sense" and "collision detection." If a node is able to detect whether the channel is in use, it is said that the node is able to carrier sense. For a node to be able to carrier sense it must be able to receive the transmissions of every other node in the network. If two nodes simultaneously transmit a message on the shared channel, both messages will be distorted and neither understood. This is referred to as a "collision." Like carrier sense, for a node to be capable of collision detection it must be able to receive the transmissions of every other node in the network.

The scale of a broadcast network is important for determining whether the carrier sense and collision detection methods can be used to solve the channel access problem. A home network consists of nodes that are relatively close together, generally being spaced apart by less than a meter to a few dozen meters. In a local area network ("LAN"), nodes may be separated by distances up to a few kilometers. The nodes in a wide area network ("WAN") may be separated by thousands of kilometers. If the maximum distance between the nodes in a broadcast network is relatively small, the amount of signal attenuation is also generally small so that each node is able to receive the transmissions of all nodes in the network. In addition, the propagation time for a signal to reach the most distant node in the network is also relatively small, fixed, and known ahead of time. Thus, it is possible and practical to design a small scale broadcast network, such as a home network or a LAN, that is capable of carrier sensing and collision detection.

To implement collision detection, a sending node may listen for a collision while it transmits a message and for a predetermined short fixed time thereafter. If the sending node does not detect a collision within the time period, the node can assume that its message did not collide with another transmission. It may be impractical or difficult, however, to listen for collisions. In these circumstances, a sending node may infer that a collision occurred if it does not receive an acknowledgment from the receiving node within a predetermined time period after it sends a message.

Generally, transmission media may be wired or wireless. Copper wire and fibre optic cable are examples of wired media. The earth's atmosphere used by radio transmissions is an example of wireless media. A particular transmission media may be capable of carrying more than one communication channel. For instance, radio transmissions generally use a relatively narrow frequency band as a single communication channel.

Whether carrier sense and collision detection are possible depends on both the scale of the network and the type of transmission media used. If all of the nodes of a small scale, wired broadcast network are provided with enough transmit power so that a sending node's transmissions can be received by every node in the network, it has been generally assumed that all of the nodes can be provided with carrier sense and collision detection capabilities. In addition, it has been assumed that the nodes of such a network may be provided with collision avoidance capabilities, which are described below. These assumptions are generally not made, however, in a wireless network. Every node in a wireless network may not be within range of a transmitting node. Further, even if a transmitter uses sufficient power to reach every node in the network under dry atmospheric conditions, radio waves may be absorbed during rainy conditions. Moreover, in wireless networks the nodes are frequently mobile and nodes may be moved to positions where terrain blocks radio reception. In addition, wireless transmissions may be interfered with by other radio transmissions, both natural and man-made. Thus, protocols which rely on carrier sense and collision detection are typically not employed in wireless networks.

A number of communication protocols have been developed for use in broadcast networks. According to one early protocol, which employed only collision detection, whenever a node needed to send a message, it simply transmitted the message. The sending node listened to the channel and if a collision was detected, the sender waited a random time and then re-sent the message. In the case of a collision, if each of the two senders were to wait the same time period, the re-sent messages would again collide. Thus, by having each node wait a random time, the problem of simultaneous re-transmission is minimized. A network using this protocol is, however, very inefficient for a great deal of time is spent waiting and re-transmitting messages as a result of frequent collisions. The efficiency of the protocol can be improved by requiring that nodes send messages only at the start of periodic time intervals or "time slots," but a great deal of time is still wasted.

With the early protocol described above, the nodes do not check to see if the channel is in use before sending a message. In another protocol, referred to as Carrier Sense Multiple Access ("CSMA"), the nodes first listen (carrier sense) to see if the channel is in use before transmitting. If the channel is not in use, the node sends its message. If the channel is in use, the node waits until the channel is idle and then transmits its message.

A problem with the CSMA protocol is that collisions can still occur. A node can sense that the network is idle and start sending a message only to discover that another node began transmitting on the channel at the same time or just before it started sending its message. The Carrier Sense Multiple Access with Collision Detection ("CSMA/CD") protocol improves on the CSMA protocol by requiring nodes to immediately stop transmitting when they detect a collision. After collision detection, each node waits a random time before again attempting to transmit. The CSMA/CD protocol is widely used in wired LANs, such as Ethernet.

Other types of protocols solve the multiple access problem by attempting to avoid collisions altogether. In protocols using collision avoidance, the time period during which a node is transmitting on the channel may be referred to as a "transmission period" and the period between transmission may be called a "contention period." In one type of collision-free protocol known as the Basic Bit-Map protocol, the contention period is divided into N time slots, where N is the number of nodes that belong to the network. Each node is assigned one of the time slots and if a node has a message ready to transmit, it sends a bit during its time slot to reserve a transmission period on the channel. At the end of the contention period, those nodes having a message to send take turns sending their messages in the same sequence as their respective time slot positions.

One problem with the protocols that use carrier sense, collision detection, or collision avoidance is the limited bandwidth provided by the single communication channel. Even if the channel is used efficiently to maximize transmit time and minimize contention periods, as it is with CSMA/CD, it remains a problem that only one node may transmit at a time so there is still a substantial amount of time during which many of the nodes of the network cannot carry on communications. Where nodes interact frequently with many different nodes, the use of these protocols significantly degrades network performance.

As explained above, the nodes in wireless networks are generally unable to consistently perform carrier sensing and collision detection. For this reason, protocols used in wireless networks generally adopt multiple access techniques that are fundamentally different from the carrier sensing protocols described above. Wireless networks typically address the channel allocation problem by dividing or multiplexing the channel in some way. In addition, the protocols typically used in wireless networks can increase the amount of communication bandwidth available. In Frequency Division Multiple Access ("FDMA"), the available frequency spectrum is divided into frequency bands and each pair of nodes that needs to communicate is assigned the exclusive use of a band. In Time Division Multiple Access ("TDMA"), a fixed time period is divided into time slots and each node is assigned the exclusive use of one of the time slots for sending messages. In Code Division Multiple Access ("CDMA"), nodes are assigned a distinct code waveform (taken from a set of orthogonal waveforms) that is used to modulate a carrier wave. Decoders in receiver nodes use the assigned code waveform to demodulate the received waveform.

The Spatial Division Multiple Access ("SDMA") method is used in a particular type of wireless network: the cellular telephone network. Typically, cellular telephone networks have a number of cells with a central base station at a fixed location at the center of each cell. At any point in time, a number of mobile nodes may be distributed geographically within the cell. Cellular networks typically use SDMA in conjunction with some combination of FDMA, CDMA, or TDMA. Commonly, FDMA is used to assign one or more frequency bands as "control channels" that are reserved for the base station to send and receive requests from the mobile nodes. The base station uses the control channel to assign the remaining frequency bands (and time slots or waveform codes) for temporary use by the particular nodes currently within the cell. Adjacent cells typically do not use the same frequency bands.

The base station assigns the same frequency band to two geographically separated nodes that cannot sense one another's transmissions when SDMA is employed. For example, two nodes that are located at opposite sides of a cell may be out of range of one another and thus each node can use the same frequency band without interfering with the other. Through the simultaneous use of the same frequency band, SDMA increases the communications bandwidth of the network. However, SDMA requires the use of phased array antennae at the base station that can direct radio transmissions in a particular direction. The base station uses its ability to transmit directionally to send a message to a node at a particular location and away from the other node using the same frequency band. In addition, SDMA relies on the ability of a central base station to determine when SDMA is possible and to allocate frequency bands, time slots, or code waveforms.

In summary, broadcast networks generally need a method for allocating channel access among nodes. Protocols employing carrier sense, collision detection, and collision avoidance methods are typically used in small scale wired, networks. CSMA/CD is an access method that is commonly used in wired networks. One problem facing wired networks is the limited communication bandwidth provided by a single channel. As a result, there is a need for increased bandwidth wired broadcast networks. Wireless networks generally employ FDMA, TDMA, or CDMA protocols. In addition, SDMA is used in cellular telephone networks. FDMA, TDMA, CDMA, and SDMA protocols can increase the bandwidth available for communication. However, as implemented in cellular telephone networks, SDMA requires a central base station with a phased array antennae and nodes that are spatially separate from one another. Thus, SDMA does not appear to be adaptable for use in a wired network for increasing the communication bandwidth of the network.

Accordingly, there is a need for a method and apparatus that can provide increased bandwidth in a wired broadcast network.

SUMMARY OF THE INVENTION

A dynamically reconfigurable network according to the present invention comprises a plurality of nodes having respective transmitters and receivers for transmitting and receiving respective signals to and from one another. In one embodiment, the network is adapted to determine whether a first maximum power can be found at which a first node can transmit a first signal that provides a minimum signal-to-noise ratio at a second node without exceeding a maximum signal-to-noise ratio at a third node. If the first maximum power cannot be found, the network is further adapted to cause the first, second, and third nodes to share a single sub-network. Alternatively, if the first maximum power can be found, the network is adapted to cause the first and second nodes to share a single sub-network that the third node is not permitted to share.

Preferably, the network is further adapted to determine whether a second maximum power can be found at which a fourth node can transmit a second signal that provides a minimum signal-to-noise ratio at the third node without exceeding a maximum signal-to-noise ratio at at least one of said first and second nodes. If the second maximum power cannot be found, the network is further adapted to cause the first, second, third, and fourth nodes to share a single sub-network. If the second maximum power can be found, the network is further adapted to cause the first and second nodes to share a single sub-network and the third and fourth nodes to share a single sub-network.

Preferably, the network is further adapted to: (1) determine, based at least in part on the first maximum power, a first maximum data rate permitted to transmit the first signal with an acceptable quality of service at the second node; (2) determine, based at least in part on the second maximum power, a second maximum data rate permitted to transmit the second signal with an acceptable quality of service at the third node; (3) determine the throughput of: (a) the first signal transmitted on a second sub-network at the first power and first data rate simultaneously with the second signal being transmitted on a first sub-network at the second power and second data rate; and (4) determine the throughput of: (b) the first signal transmitted at a power greater than the first maximum power and the second signal transmitted at a power greater than the second maximum power, wherein the first and second signals share a single sub-network. If the throughput (b) exceeds the throughput (a), the network is preferably still further adapted to cause the first and fourth nodes to share a sub-network. Alternatively, if the throughput (a) exceeds the throughput (b), the network is preferably still further adapted to cause the third and fourth node to share a first sub-network and the first and second nodes to share a second sub-network.

The foregoing and other objectives, features, and advantages of the invention will be more readily understood upon consideration of the following detailed description of the invention, taken in conjunction with the accompanying drawings.

DETAILED DESCRIPTION

Figure 1:
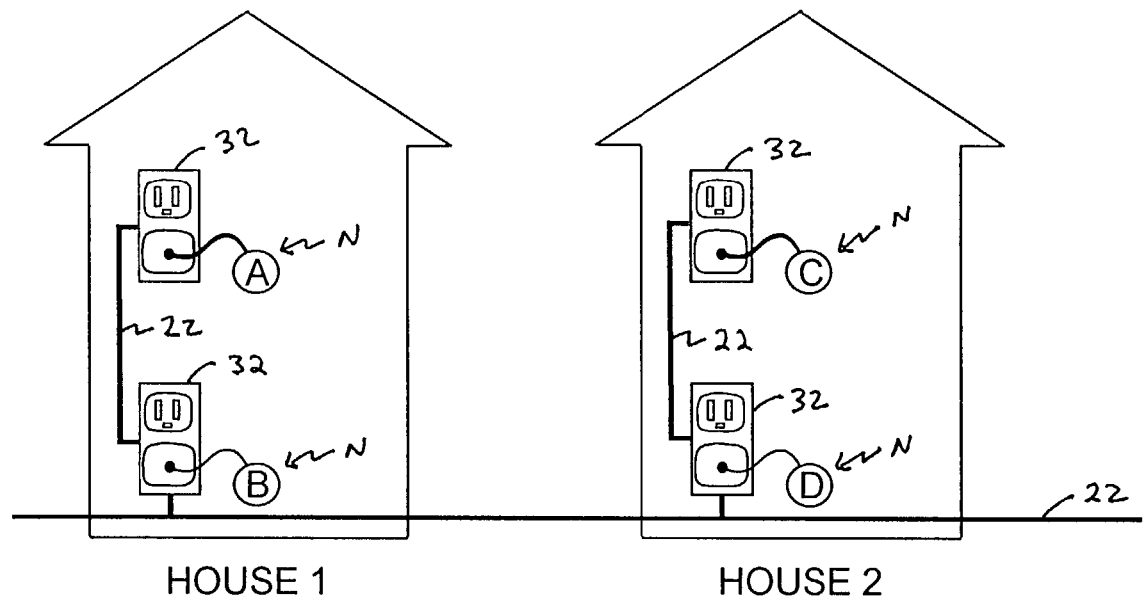
FIG. 1 is a schematic diagram of a first configuration of a power line network according to the present invention.

In a preferred embodiment of a dynamically reconfigurable network 20 according to the present invention, there are a plurality of nodes N that share the same frequency band or channel ("channel"). The nodes preferably communicate with one another over the medium of an AC power line 22, such as shown in FIG. 1, however, this is not essential to the invention.

Power Line Networks

In contrast to other wired communication networks, the primary purpose of a power line network is to deliver power. As such, power line networks are not optimized for the transmission of communication signals. Communication signals in power line networks experience significantly greater attenuation and signal distortion than is found in other wired communication networks. Wire nuts, switches, wall socket outlets and their appliance loads create impedance discontinuities. Impedance mismatches reduce and increase energy at various frequencies and are created every time an appliance is plugged in or removed from the network. Thus, the magnitude of signal attenuation between any two nodes on a network will increase with the number of impedance mismatches between the nodes. Further, the magnitude of attenuation versus frequency will be variable as appliances are added and removed from the power line.

Figure 2:
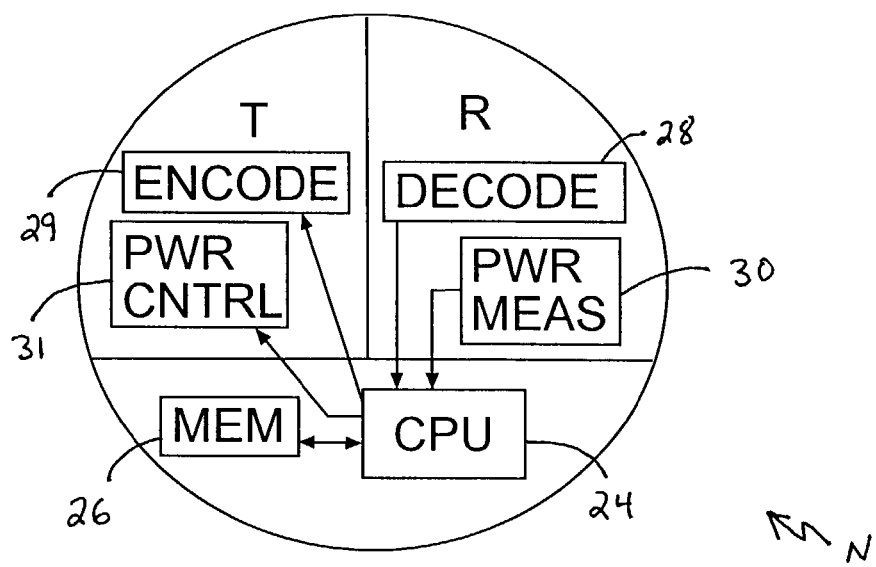
FIG. 2 is a block diagram of a typical node according to the present invention.

Referring to FIG. 2, the nodes N have respective transmitters T and receivers R for transmitting and receiving, respectively, signals which are typically electrical signals but which may be sonic, radio, optical, or other signals. Each node N preferably includes a CPU 24, a memory 26, a decode circuit or other decode software 28, and a power measuring circuit 30. In addition, each node N preferably includes an encode circuit or encode software 29, and a power control circuit 31 for controlling transmit power. The nodes are sufficiently close to one another in the network so that all of the nodes can receive a signal transmitted by any other node in the network at a level that meets or exceeds the required signal-to-noise ratio ("SNR") for the node when the signal is transmitted at the highest transmit power and lowest data rate for transmitting a signal. This transmit power is hereinafter referred to as HIPAR mode.

Quality of Service

The shown network 20 may be used for a variety of applications, such as email, file transfer, Web access, remote login, audio, or video. Different applications have different reliability, delay, jitter, and bandwidth requirements. For example, some applications, such as file transfer, require that every data element be reliably sent, but others do not (e.g., audio and video). Similarly, certain applications require that data elements be sent with no more than some maximum delay while for other applications, delay is not critical. Jitter refers to the variability in data packet arrival times. Applications such as audio and video streaming require low jitter whereas in other applications, such as email or file transfer, high jitter is acceptable. Likewise, different applications have different bandwidth needs. Reliability, delay, jitter, and bandwidth are used to define the "quality of service" needed by a particular application. A particular quality of service describes values for the reliability, delay, jitter, and bandwidth parameters that are minimally acceptable for a particular application.

The nodes N are portable, preferably by being removably plugged into respective wall outlets 32 (FIG. 1), creating an "ad hoc" or randomized network. For convenience, it is assumed that the network 20 is initially arranged so that the nodes do not know the relative location of the other nodes in the network. It is desired to optimize the total communication capacity or bandwidth of the network. According to the invention, the network 20 provides "SDMA" in a wired "channel sharing" environment, as these phrases are defined below.

Channel Sharing

The phrase channel sharing, as used herein, is intended to refer to protocols that use carrier sense, collision detection, or collision avoidance, such as CSMA, CSMA/CD, CSMA/CA, Basic Bit-map, or any protocol based on one or more of these methods that is known in the art. In addition, channel sharing is intended to refer to protocols that multiplex the channel in the time or frequency domain, such as TDMA or FDMA, or any protocol based on one or more of these methods that is known in the art. Further, channel sharing is intended to refer to protocols that use a coding method, such as CDMA. Moreover, channel sharing is intended to refer to any combination of these methods. However, channel sharing does not include SDMA, as that term is used hereinafter.

SDMA

In the prior art, the term SDMA has a limited meaning, referring to dividing space in a particular manner. For example, in cellular telephone networks, SDMA refers to dividing space into arc-segments by use of phased array antennas. By contrast, SDMA as the term is used hereinafter is intended to refer broadly to any form or manner of spatial division, and refers particularly to the manner of spatial division described below. The inventor has recognized that, under certain circumstances, it is possible to increase the overall capacity of a wired network by dividing the network in space to create two or more separate channel sharing sub-networks. The manner in which these circumstances may be recognized takes into account the amount by which a signal is attenuated on the path between nodes and is described in detail below. Moreover, it is often advantageous to provide SDMA in wired networks in which each device in the network is enabled to determine whether to initiate or accept requests for power reductions and changes in data rates.

To illustrate, consider a network having a destination node that is near in space to a first source node, but is far away in space from a second source node. According to the principles of the present invention, the destination node may actually be closer, for purposes of communication, to the second source node than it is to the first. Thus, the destination node and the second source node may advantageously be grouped into a channel sharing sub-network that excludes the first source node. The first source node may be farther from the destination node, for purposes of communication, because the signal path loss is greater between the first source node and the destination node than it is between the second source node and the destination node.

Referring to FIG. 1, an embodiment of the network 20 includes four nodes N: A, B, C, and D. Nodes A and B are located in House 1 while nodes C and D are located in House 2. It is assumed that when any node transmits at the highest power (and data rate) available, all of the other nodes will receive the transmission. Therefore, interference between the houses is possible. That is, a communication link between nodes A and B (link AB) in House 1 cannot operate at the maximum power without interfering with a communication link between nodes C and D (link CD) in House 2 and vice versa. Standard channel sharing methods may be used so that the links AB and CD can use the same channel. Of course, the channel sharing methods may reduce the effective data rate for each of the links.

On the other hand, it may be possible to reduce the power on both links so that the links are still operable, but neither link interferes with the other. A reduced data rate may be required as the power is reduced. In some cases there is adequate SNR to reduce power without reducing the data rate. Two links simultaneously transmitting at a reduced data rate on separate sub-networks created using the SDMA method of the present invention, however, may be able to transfer data at a higher overall rate than can be obtained by employing standard channel sharing methods using a single sub-network, even though the two links using the single sub-network are able to use a higher data rate. When operating at reduced power, the two links can be considered to be two separate SDMA sub-networks where the standard channel sharing techniques may still apply within the sub-networks, but not be necessarily between the networks.

Figure 3:
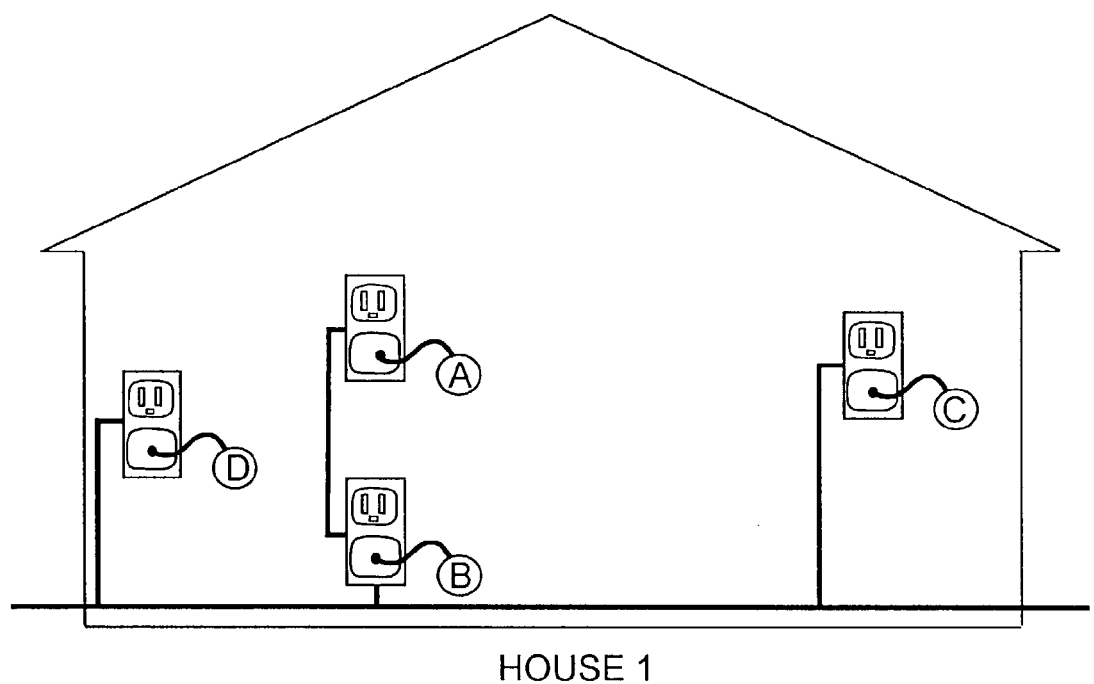
FIG. 3 is a schematic diagram of a second configuration of a power line network according to the present invention.

Sometimes, however, reducing power reduces the overall capacity of the network or system. FIG. 3 shows the network 20 of FIG. 1, however, all of the nodes are located in one house. Assume node A needs to communicate with node B and node C needs to communicate with node D. If node D is closer to A than it is to C, the power with which A transmits to B cannot be reduced enough to prevent A's transmissions from interfering with reception at D. Moreover, if A and B reduce their transmit power, node C becomes a "hidden node" which cannot detect the communications on the AB link. Therefore, C may attempt transmission to D without knowing of the likely impending collision with communications on the link AB.

Therefore, power reduction works well to improve overall network performance under some configurations of node placement and not under others. It may now be appreciated that power reduction may be used to improve overall network performance when the "interference distances" from each node in one link to the nodes of the other link is larger than the "communications distance" between communicating nodes of the respective links. It is further recognized that making this determination requires knowledge of the actively communicating nodes and their configuration in the network. (The terms interference distance ("ID") and communication distance ("CD") are more precisely defined below.)

According to the invention, preferably, each node in the network determines and maintains estimates of the interference and communication distances to all neighboring nodes. The, estimated distances are derived by monitoring the control information passed between the nodes, which is possible because all control information is transmitted in the HIPAR mode where transmit power is highest and modulation has the highest noise immunity. The distances are independent of the actual transmission power of the nodes. The distances between the nodes, in conjunction with the transmission power and data modulation method employed by the node, determine the actual SNR ratios at any particular destination or receiving node.

Link Setup Control Sequence

Figure 4:
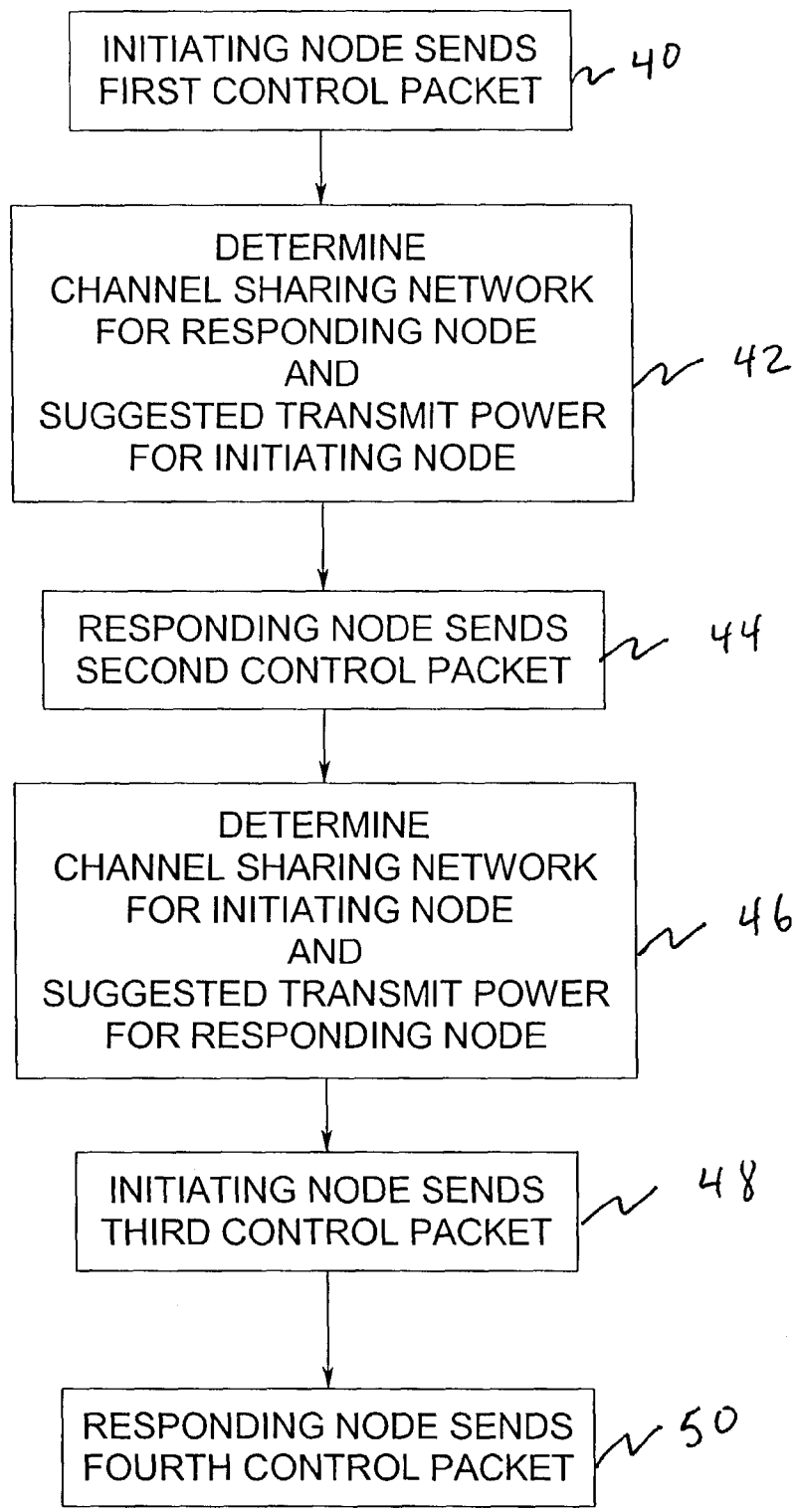
FIG. 4 is a flow diagram illustrating a method of a control setup sequence according to the present invention.

Referring to FIG. 4, a node N begins to set up communications links with other nodes by initiating, in HIPAR mode, a "Link Setup Control Sequence." Within one preferred embodiment of the Link Setup Control Sequence for establishing a communications link between an initiating (or source) node and a responding (or destination) node, a first control packet is transmitted from the initiating node in a step 40. The first control packet preferably includes: (1) the amount of data the initiating node needs to transmit; (2) the quality of service required for the initiating node's data; (3) the HIPAR transmit power being used by the initiating node for transmitting the first control packet; (4) the noise floor for the initiating node; and (5) the lowest or minimum SNR the initiating node requires for reliable HIPAR reception.

It is assumed that the other nodes in the network receive the first control packet because it is being broadcast in HIPAR mode. The responding nodes are adapted to measure the power of the transmitted signal as it is received and since the first control packet indicates the power at which the packet is being transmitted, the responding node can calculate the power loss in the transmission. The transmit power for effective communication between a source node and destination node must be large enough to overcome this transmission loss. In addition, the transmit power must be sufficient to meet the minimum SNR requirements at the destination node.

In response to having received the first control packet, the destination node transmits a second control packet (step 44) that preferably includes: (1) the amount of data the responding node needs to transmit; (2) the quality of service required for the responding node's data; (3) the power level of the first control packet as it was received by the responding node; (4) the HIPAR transmit power being used by the responding node for transmitting the second control packet; (5) the noise floor for the responding node; (6) a suggested transmit power for the initiating node to use when transmitting to the responding node; (7) a suggested data rate for the initiating node to use when transmitting to the responding node; and (8) the lowest or minimum SNR the responding node requires for reliable HIPAR reception. The manner in which the suggested transmit power (6) and data rate (7) are determined is explained below.

The initiating node transmits a third control packet (step 48) back to the responding node in response to its receipt of the second control packet. The third control packet preferably includes: (1) the power level of the second control packet as it was received by the initiating node; (2) a suggested transmit power for the responding node to use when transmitting to the initiating node; (3) a suggested data rate for the responding node to use when transmitting to the initiating node; (4) an actual transmit power the initiating node will use when transmitting to the responding node; and (5) an actual data rate the initiating node will use when transmitting to the responding node.

A fourth control packet may be issued by the responding node (step 50) in response to its receipt of the third control packet. The fourth control packet that preferably includes: (1) an actual transmit power the responding node will use when transmitting to the initiating node; and (2) an actual data rate the responding node will use when transmitting to the initiating node. This completes the Link Setup Control Sequence and the nodes enter an "application data mode," which may be referred to simply as "Data" mode. The transmission of application data is made at the announced actual transmit powers and data rates when the nodes are in Data mode.

From the information exchanged within the Link Setup Control Sequence, each node populates and maintains a database of information on all active nodes and links. From this database, each node is able to determine which other nodes are within the node's channel sharing sub-network, which nodes may be considered to be outside of the node's channel sharing sub-network, and appropriate power and data rate settings for the current network configuration. (How the information in this database is used to determine a node's channel sharing sub-network and transmit power is explained below with reference to FIGS. 5A, 5B.) From this information, the responding node preferably includes in the second control packet the suggested network addresses of those nodes that are determined to be in the responding node's channel sharing sub-network. The initiating node preferably responds by including in the third control packet the actual network addresses of those nodes that are determined to be in the initiating node's channel sharing sub-network. Finally, the responding node preferably provides in the fourth control packet the actual network addresses of those nodes that are determined to be in the node's channel sharing sub-network.

Identification of Members of Channel Sharing Network

Figure 5A:
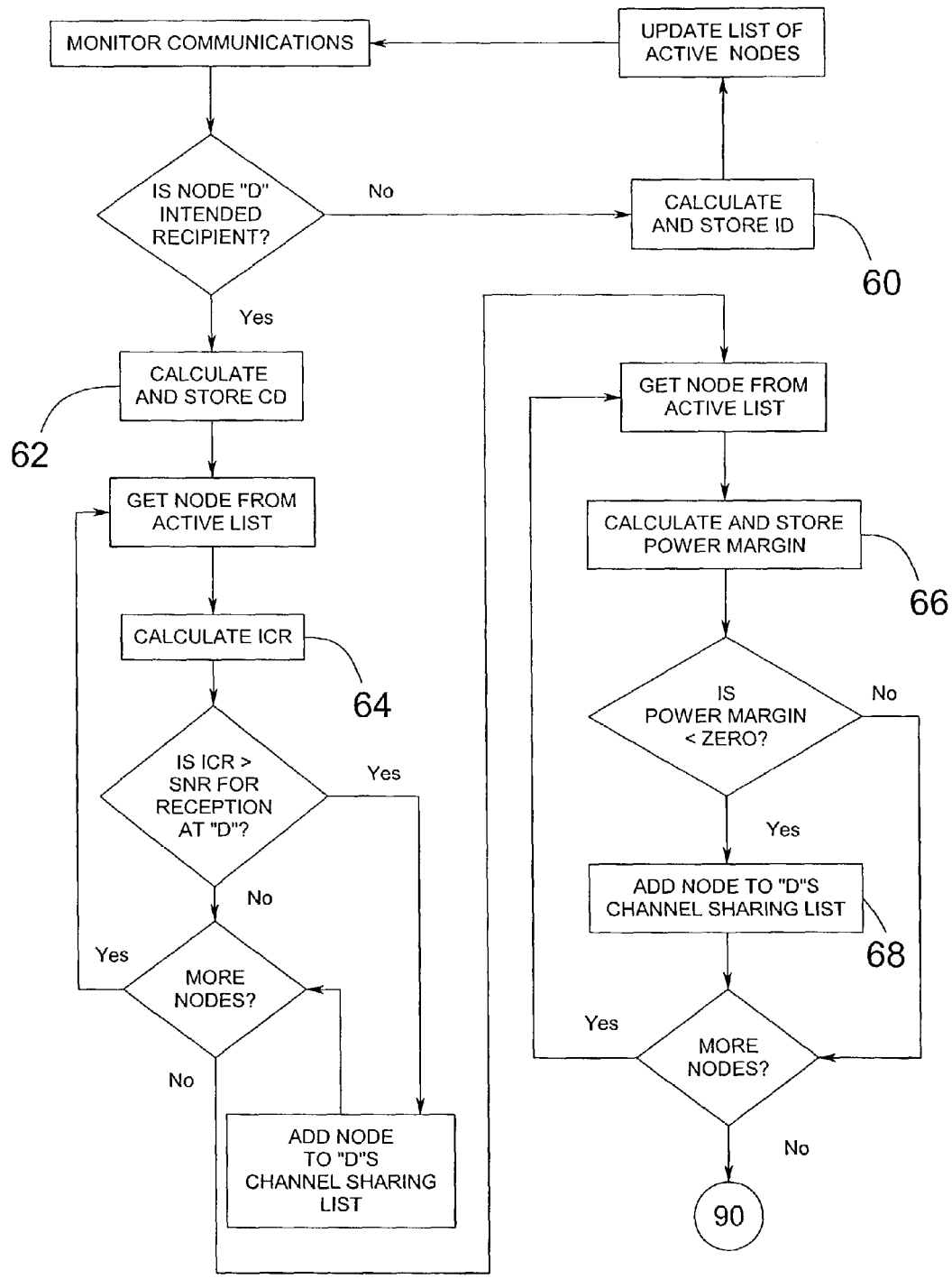
FIGS. 5A and 5B are flow diagrams illustrating a method of establishing a channel sharing list and a suggested transmit power according to the present invention.
Figure 5B:
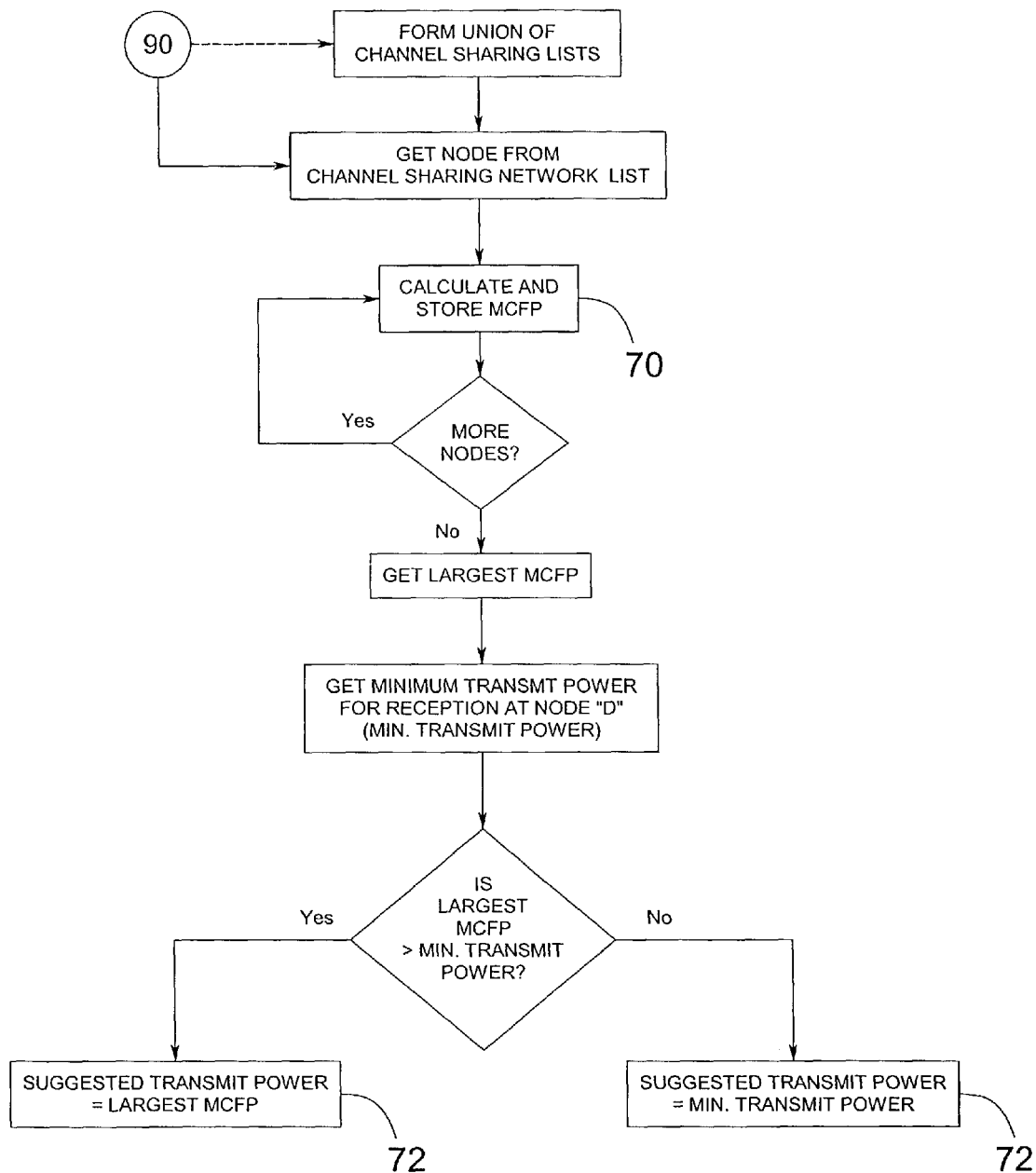

In step 42 of the Link Setup Control Sequence, a channel sharing sub-network for the destination node and a suggested transmit power for the initiating node are determined. Referring to FIGS. 5A and 5B, more particularly, a method is shown for identifying the members of a channel sharing sub-network and setting the transmit power and data rate in a communications link. The method is accomplished by a series of calculations that are preferably performed by the nodes in the active links. In a first step 60 of the method, an interference distance ID is calculated between a destination node "d" and all active nodes that could potentially interfere with communications within the link, i.e., transmissions from active potentially interfering source nodes "is" to respective destination nodes "id." The interference distance ID from a source node "is" is the difference between the transmitted signal power ("TPI") in HIPAR mode at the source node "is" and the received signal power ("RPI") at the destination node "d" from the same transmission.

$$ID_{d,\,is,\,id} = TPI_{is,\,id} - RPI_{d,\,is,\,id} \quad \text{(Eqn 1)}$$

As equation 1 shows, the interference distance ID increases with increased attenuation of the transmit signal.

In a second step 62 of the method, a "communications distance" ("CD") is calculated between the source node "s" and the destination node "d" of the link. Analogous to the interference distance, the communications distance CD between the nodes "s" and "d" is the difference between the HIPAR transmitted power from the node "s" ("TPS") and the received power at node "d" from the same transmission ("RPS"):

$$CD_{s,\,d} = TPS_s - RPS_{s,\,d} \quad \text{(Eqn 2)}$$

As with the interference distance ID, the communications distance CD increases with increased attenuation of the transmit signal.

In a third step 64 of the method, a set of "interference to communications ratios" ("ICR's") is established for the node "d" in view of all of the nodes "is" as the difference between the interference distance ID and the communications distance CD:

$$ICR_{s,\,d,\,is,\,id} = ID_{d,\,is,\,id} - CD_{s,\,d} \quad \text{(Eqn 3)}$$

Note that the ICR is larger where the potentially interfering source nodes are relatively far from the node "d" or the source node is relatively close to the node "d." Accordingly, the magnitude of the ICR represents the capability of the communications link between nodes "s" and "d" to operate independently of the communications links between other nodes.

The ICR's may also be compared to an SNR. Particularly, the ICR's for the node "d" having values greater than the minimum SNR required for reliable reception at the node "d" in HIPAR mode ("HSNR") may be omitted from the channel sharing network for the node. Whether the potentially interfering source node "is" associated with the ICR can be omitted depends on the data modulation method or data rate to be used, any additional power required by the source "s" to communicate with other members of the channel sharing network, and any power reductions taken by the potentially interfering links.

More particularly, in a fourth step 66 of the method, a "power margin" ("PM") may be established for deciding whether to include a node in the channel sharing sub-network for the node "d:"

$$PM_{s,\,d,\,is,\,id} = RPS_{s,\,d} - RPI_{d,\,is,\,id} - HSNR_d, \quad \text{(Eqn 4)}$$

The power margin PM is a measure of the amount by which the signal received at the destination node "d" is above the minimum SNR for reliable reception at "d" when the signal is transmitted at a data mode power level. By use of equations 1-3 and assuming that the initial HIPAR transmit signals employ the same power level, equation 4 becomes:

$$PM_{s,\,d,\,is,\,id} = ICR_{s,\,d,\,is,\,id} - HSNR_d \quad \text{(Eqn 5)}$$

Finally, taking into account power reductions employed in the Data mode within the communicating link and between the potentially interfering sources "is" and their respective destinations, equation 5 becomes:

$$PM_{s,d,is,id} = ICR_{s,d,is,id} - HSNR_d + IPD_{is,id} - DMD_{s,d},$$ (Eqn 6)

where the "interferer power delta" IPD and the "data modulation delta" DMD are the respective changes in the SNR at node "d" as a result of changing the data modulation or data rate from that employed in HIPAR mode to that used in Data mode. It will be appreciated that higher data rates are possible when higher transmit power is used. The power margins PM indicate the ease that a signal transmitted from node "s" can be received at "d" while another link between "is" and "id" is transmitting simultaneously.

As mentioned a minimum SNR at a destination node is used in determining the power margin. In addition, a maximum SNR may be defined for determining whether a signal will interfere with reception at a node that is not the intended recipient of the signal. Particularly, assuming that a source node that is transmitting a first signal to a destination node, the source node must transmit it at a power such that when the signal is received by a third node it is below a maximum SNR at the third node in order that it not interfere with reception at the third node of a signal sent from a fourth node. For any given node, the maximum and minimum SNRs will generally be different. This is because the received strength of a signal required for reliable reception generally needs to be higher than the received strength of a signal that will interfere with the reliable reception of another signal. The maximum SNR for a node will vary depending on the received strength of the particular signal for which the node is the intended recipient.

Once the power margins are established, the members of the CSMA network for the node "d" may be determined in a fifth step 68 of the method. Particularly, considering each potentially interfering source "is" in a potentially interfering communications link between "is" and "id" from the standpoint of the node "d" in a desired communications link between "s" and "d," if the power margin PM is less than zero, the source "is" must be a member of the channel sharing network of the node "d." On the other hand, if the power margin PM is greater than or equal to zero, the communications link between "s" and "d" can be operated simultaneously with the link between "is" and "id" and these nodes should not initially be included in the channel sharing network of destination node "d."

Where the power margin PM is less than zero and, therefore, the potentially interfering link must be part of the channel sharing network for the node "d", the actual transmit power of the source node "s" may advantageously be raised beyond the minimum SNR required by the node "d" in order to potentially provide a higher data rate between node "s" and node "d." However, for the channel sharing network to operate in its entirety, the transmit power must be raised sufficiently so that the transmission from "s" can reach the node in the channel sharing networks of both nodes "d" and "s" that is the farthest from the source node "s." This power is termed "minimum collision free power" ("MCFP"). The MCFP is determined in a sixth step 70 of the method by adding the interference distance ID to the most distant node and the noise floor (NF) at the distant node, and subtracting the minimum SNR for reception in HIPAR mode required by the distant node:

$$MCFP = ID_{distant\text{-}node} + NF_{distant\text{-}node} - HSNR_{distant\text{-}node}$$ (Eqn 7)

As mentioned above, in the second control packet, the destination (or responding) node suggests a power level for the source (or initiating) node to use in its Data mode transmissions to the destination node. In a step 72, the power level that is suggested is the greater of the power required for minimum signal reception at "d" or the minimum collision free power. The suggested power level represents the lowest possible power consistent with the application's quality of service needs and the reasonable operation of the channel sharing mode.

On completion of step 72, all the information needed for the second control packet has been calculated. As mentioned, the destination node transmits the second control packet in step 44 of the Link Setup Control Sequence shown in FIG. 4.

In response to receiving the second control packet, a channel sharing network for the initiating node and a suggested transmit power for the destination node are determined in a step 46 of the Link Setup Control Sequence. In step 46, steps 60-72 of the method shown in FIGS. 5A-5B are repeated with respect to the source node, as the initiating node in the Link Setup Control Sequence, as though it were the destination node.

When step 68 is complete for the source node, respective channel sharing networks are defined for both the source and destination nodes. Preferably, the union of the two channel sharing networks is formed which is the actual channel sharing network that will be used for the link. The sixth and seventh steps 70, 72 are repeated with respect to the source node. On completion of step 72, all of the information needed for the source node to transmit the third control packet is available, including a suggested a power level for the destination node to use in its data mode transmissions to the source node and the actual channel sharing network that the source node will use.

It should be appreciated that changes in power level, data rate, or channel sharing lists may cause cascading events. For example, two links joining a given channel sharing network may force a third link to join the same network and so on, until many or all nodes are members of the same channel sharing network. When a new node is added to a network, the power margin is recalculated for each existing node in the channel sharing network. Any node for which the power margin PM becomes less than zero modifies its transmit power or data rate to ensure reliable channel sharing operation with the other members of its channel sharing network.

As an example of the some of the aforementioned principles, referring to back FIG. 3, a link between the nodes A and B ("link AB") is set up using a Link Setup Control Sequence. Because no other nodes were active at the time that link AB was set up, the link uses the minimum transmit power required to communicate in Data mode. Further, the nodes A and B make up a channel sharing network. Node D monitored the Link Setup Control Sequence. Subsequently, node D needs to establish a link with node C ("link CD"). Based on the shown interference and communication distances, A's Data mode transmissions received at node D are large enough to prevent D from receiving transmissions from node C at the same time. Hence, from node D's standpoint as well as in practical effect, channel sharing operation of the link CD is required. The interference distances (ID) between node D and either of nodes A and B are small relative to the communications distance between nodes D and C (of the link CD).

Figure 6:
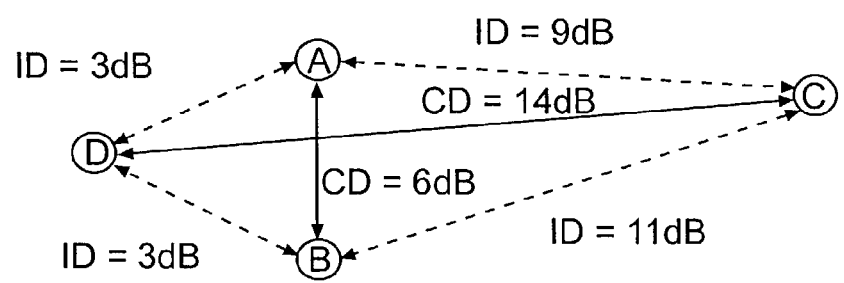
FIG. 6 is a block diagram of the second configuration of a power line network shown in FIG. 3 that additionally includes network communication parameters.

Referring to FIG. 6, exemplary interference distances (ID's), communications distances (CD's) are shown for the two links AB and CD. Assuming the interference distance between nodes D and A is 3 dB, the interference distance between nodes D and B is 3 dB, the interference distance between the nodes A and C is 9 dB, the interference distance between the nodes B and C is 11 dB, the communications distance between the nodes A and B is 6 dB, and the communications distance between the nodes C and D is 14 dB, the following ICR's for the network are:

$ICR_{AB}$(with respect to transmissions from "is"=node C)=9−6=+3 dB, $ICR_{AB}$(with respect to transmissions from "is"=node $D$)=3−6=−3 dB, $ICR_{BA}$(with respect to transmissions from "is"=node $C$)=11−6=+5 dB, $ICR_{BA}$(with respect to transmissions from "is"=node $D$)=3−6=−3 dB, $ICR_{CD}$(with respect to transmissions from "is"=node $A$)=9−14=−5 dB, $ICR_{CD}$(with respect to transmissions from "is"=node $B$)=11−14=−3 dB, $ICR_{DC}$(with respect to transmissions from "is"=node $A$)=3−14=−11 dB, and $ICR_{DC}$(with respect to transmissions from "is"=node $B$)=3−14=−11 dB.

As explained above, the ICR for a node is large where the potentially interfering source nodes are relatively far from the node or the communications distance to the source node is relatively small. If the ICR for a node is large, it is easier for the link to operate without interfering with reception at other nodes. For example, inspection of FIG. 5 reveals that it appears to be relatively easy for nodes A and B to communicate and not interfere with reception (of a transmission from node D) at node C (i.e., $ICR_{AB}$ with respect to transmissions from node D is relatively large at +3 dB).

With reference to equation 6, for an exemplary HNSR=3 dB, DMD=3 dB, and IPD=0, the following power margins for the ICR's given above are:

$PM_{AB}$(with respect to transmissions from "is"=node $C$)=3−3−3=−3 dB, $PM_{AB}$(with respect to transmissions from "is"=node $D$)=−3−3−3=−9 dB, $PM_{BA}$(with respect to transmissions from "is"=node $C$)=5−3−3=−1 dB, $PM_{BA}$(with respect to transmissions from "is"=node $D$)=−3−3−3=−9 dB, $PM_{CD}$(with respect to transmissions from "is"=node $A$)=−5−3−3=−11 dB, $PM_{CD}$(with respect to transmissions from "is"=node $B$)=−3−3−3=−9 dB, $PM_{DC}$(with respect to transmissions from "is"=node $A$)=−11−3−3=−17 dB, and $PM_{DC}$(with respect to transmissions from "is"=node $B$)=−11−3−3=−17 dB.

It is not necessary that all of the power margins are less than zero to determine that the link CD must be included in the same channel sharing network that includes the link AB. However, if all of the power margins are less than zero, it is clear that transmissions from either C or D to the other will interfere with reception at the both of nodes A and B, and vice versa.

Since all four nodes belong to the same channel sharing network, it is preferred that the farthest node C be able to sense transmissions of the all of the other nodes. In order to ensure that the farthest node C can sense all transmissions, the transmit power of node B may be raised over the minimum power required to transmit to node A according to step 72 and the MCFP of equation 8. The node B (at an interference distance of 11 dB from node C) is the farthest node in the network from node C.

Figure 7:
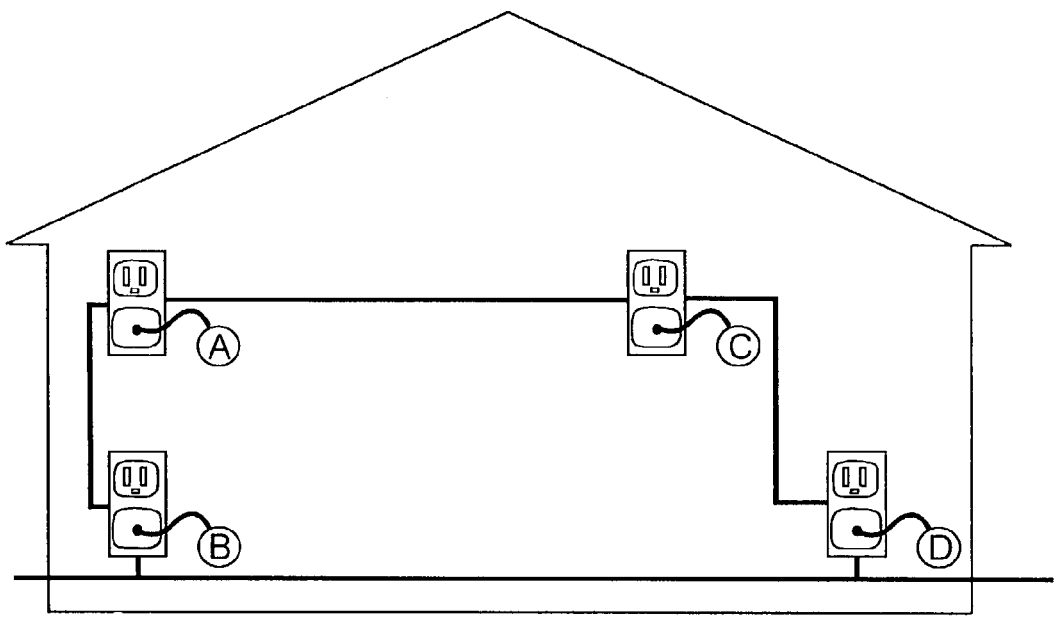
FIG. 7 is a schematic diagram of a third configuration of a power line network according to the present invention.

Turning to FIG. 7, another example of the four node network 20 is shown which permits multiple channel sharing networks. Communications between nodes A and B (link AB) can be carried on simultaneously with communications between the nodes C and D (link CD) because the interference distances to potentially interfering nodes are greater than the communications distances between the nodes in the links.

Figure 8:
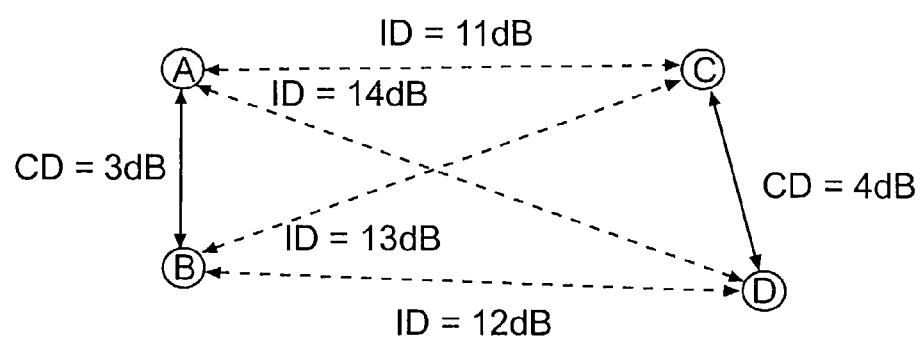
FIG. 8 is a block diagram of the third configuration of a power line network shown in FIG. 7 that additionally includes network communication parameters.

Turning to FIG. 8, exemplary interference distances (ID's) and communications distances (CD's) are shown for the two links AB and CD. Assuming the interference distance between nodes D and A is 14 dB, the interference distance between nodes D and B is 12 dB, the interference distance between the nodes A and C is 11 dB, the interference distance between the nodes B and C is 13 dB, the communications distance between the nodes A and B is 3 dB, and the communications distance between the nodes C and D is 4 dB, the following ICR's are:

$ICR_{AB}$ (with respect to transmissions from "is"=node $C$)=11−3=+8 dB, $ICR_{AB}$ (with respect to transmissions from "is"=node $D$)=14−3=+11 dB, $ICR_{BA}$(with respect to transmissions from "is"=node $C$)=13−3=+10 dB, $ICR_{BA}$(with respect to transmissions from "is"=node $D$)=12−3=+9 dB, $ICR_{CD}$(with respect to transmissions from "is"=node $A$)=11−4=+7 dB, $ICR_{CD}$(with respect to transmissions from "is"=node $B$)=13−4=+9 dB, $ICR_{DC}$(with respect to transmissions from "is"=node $A$)=14−4=+10 dB, and $ICR_{DC}$(with respect to transmissions from "is"=node $B$)=12−4=+8 dB.

With reference to equation 6, for an exemplary HNSR=3 dB, DMD=3 dB, and IPD=0, the following corresponding power margins are:

$PM_{AB}$(with respect to transmissions from "is"=node $C$)=+8−3−3=+2 dB, $PM_{AB}$(with respect to transmissions from "is"=node $D$)=11−3−3=+5 dB, $PM_{BA}$(with respect to transmissions from "is"=node $C$)=10−3−3=+4 dB, $PM_{BA}$(with respect to transmissions from "is"=node $D$)=9−3−3=+6 dB, $PM_{CD}$(with respect to transmissions from "is"=node $A$)=7−3−3=+1 dB, $PM_{CD}$(with respect to transmissions from "is"=node $B$)=9−3−3=+3 dB, $PM_{DC}$(with respect to transmissions from "is"=node $A$)=10−3−3=+4 dB, and $PM_{DC}$(with respect to transmissions from "is"=node $B$)=8−3−3=+2 dB.

In this example, all the PM's for the links AB and CD are greater than zero, so the links AB and CD may be operated simultaneously as separate channel sharing sub-networks. Individually, for example, node D calculates $ICR_{DC}$ with respect to transmissions from both potentially interfering source nodes, "is"=node A and "is"=node B. Node D determines that the minimum ICR for the two potentially interfering source nodes is +8 dB for node B. The power margin PM at node C transmissions to node D is 2 dB with respect to node B which is associated with the minimum ICR. Because +2dB is greater than zero, node D believes that SDMA operation with respect to the link AB is possible. Preferably, this hypothesis is accepted and confirmed by node C since node D typically only know its ICR's relative to nodes A, B, and C, but generally does not know the ICR's for node C relative to the nodes A and B.

Therefore, node D suggests to node C a power level (e.g., in the second control packet) for node C that is equal to the minimum SNR required for the node D at its data rate. The minimum ICR for node C is +7 dB (with respect to interference from node A). A power margin at node D for transmissions to node C is also determined based on this minimum ICR. In this example, that power margin is +7−3−3=1 dB. Since this value is also greater than zero, node C can agree that a power reduction is appropriate and proceeds to suggest to node D (e.g., in the third control packet) a power level for node D that is also equal to the minimum SNR required for the node C at its data rate. Both nodes may now proceed to transmit data at the power levels so determined.

All of the steps described above can be performed for different proposed data rates, where IPD and DMD in equation 6 are functions of the data rate, to optimize data rate at the given transmit powers. As mentioned, higher data rates are possible with higher transmit power.

The present invention permits each link to operate independently of the other links with respect to power reduction or data modulation. Thus, an advantage of the present invention is that a central controller is not needed. This is a particular advantage in a home network where the use of a central controller may be cost prohibitive or not feasible.

A further advantage of the present invention is that it permits each link to independently optimize its data rate or minimize its power consumption. The steps 60-72 described above for determining the channel sharing network for a responding node and the suggested transmit power for an initiating node may be performed for different data modulation modes, where the data modulation delta DMD in equation 6 is a function of the data modulation mode. Because equation 6 accounts for changes in HSNR and IPD, each link may periodically readjust its power level to take advantage of changes in transmit power made by other nodes.

Optimum network throughput is generally obtained by iteration wherein each link takes advantage of power reductions made by other links by increasing data rate or reducing transmit power (as indicated by equation 6). Moreover, it is an outstanding additional feature of the invention to provide for comparing the relative performance of the network as (a) a plurality of channel sharing sub-networks operating at reduced power with (b) the network operating as a single channel sharing network. Such a comparison permits use of the network configuration that provides the highest throughput. For example, if the data rate and transmit power are reduced on individual links, a point may be reached where the sum of the data rates on the individual links simultaneously operating as channel sharing sub-networks will exceed the overall data rate for the network operating in a channel sharing mode where each node uses HIPAR transmit power. Conversely, comparing the sum of the data rates for individual links operating as channel sharing sub-networks with the overall data rate for a single channel sharing network may show that the single channel sharing network has the highest overall data rate. This determination may be made with the same information obtained from the Link Setup Control Sequence.

Figure 9:
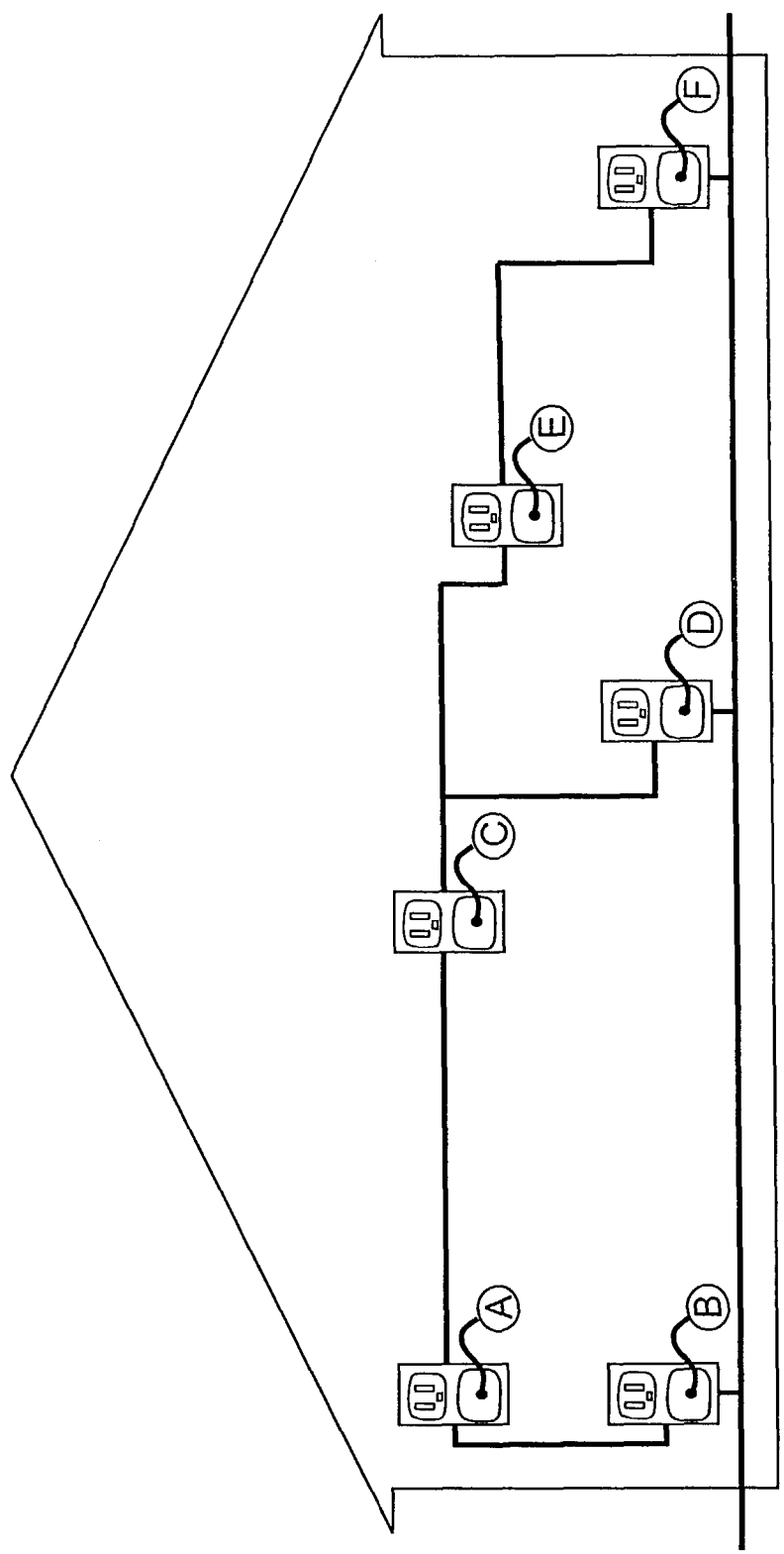
FIG. 9 is a schematic diagram of a fourth configuration of a power line network according to the present invention.

Turning to FIG. 9, additional nodes E and F are shown being added to the network of FIG. 7. Node F wants to set up a new link EF. Node F can broadcast a request for network information or acquire the information as a result of monitoring the Link Setup Control Sequences of the nodes A-D. Links AB and CD are using SDMA to operate as independent channel sharing sub-networks. Node F determines the interference distances to nodes A, B, C, and D. Node F, however, may be hidden from Data mode communications within the links AB and CD. If node F is hidden, it does not know when it can communicate with any other node without interfering or colliding with existing communications on links AB and CD. If the communicating nodes experience packet failure, it will be assumed that a collision caused the failure and the nodes will wait a random time and try again. Eventually, node F will be able to gain control of the channel and establish a link with node E using the Link Setup Control Sequence in HIPAR mode. There will be no collisions during the Link Setup Control Sequence since, in HIPAR mode, all of the nodes are aware of the transmissions by node F and their priority.

In this example, as shown in FIG. 9, due to the relative proximity of the node E to the nodes C and D as compared to its proximity to node F, the links CD and EF form a first sub-network operating in channel sharing mode while the link AB forms a second sub-network operating in channel sharing mode. The first and second sub-networks operate using SDMA relative to each other. If the node F is very far from the node E, SDMA operation may not be possible and the all of the nodes will have to be configured in a single channel sharing network (so long as the link EF is active).

Figure 10:
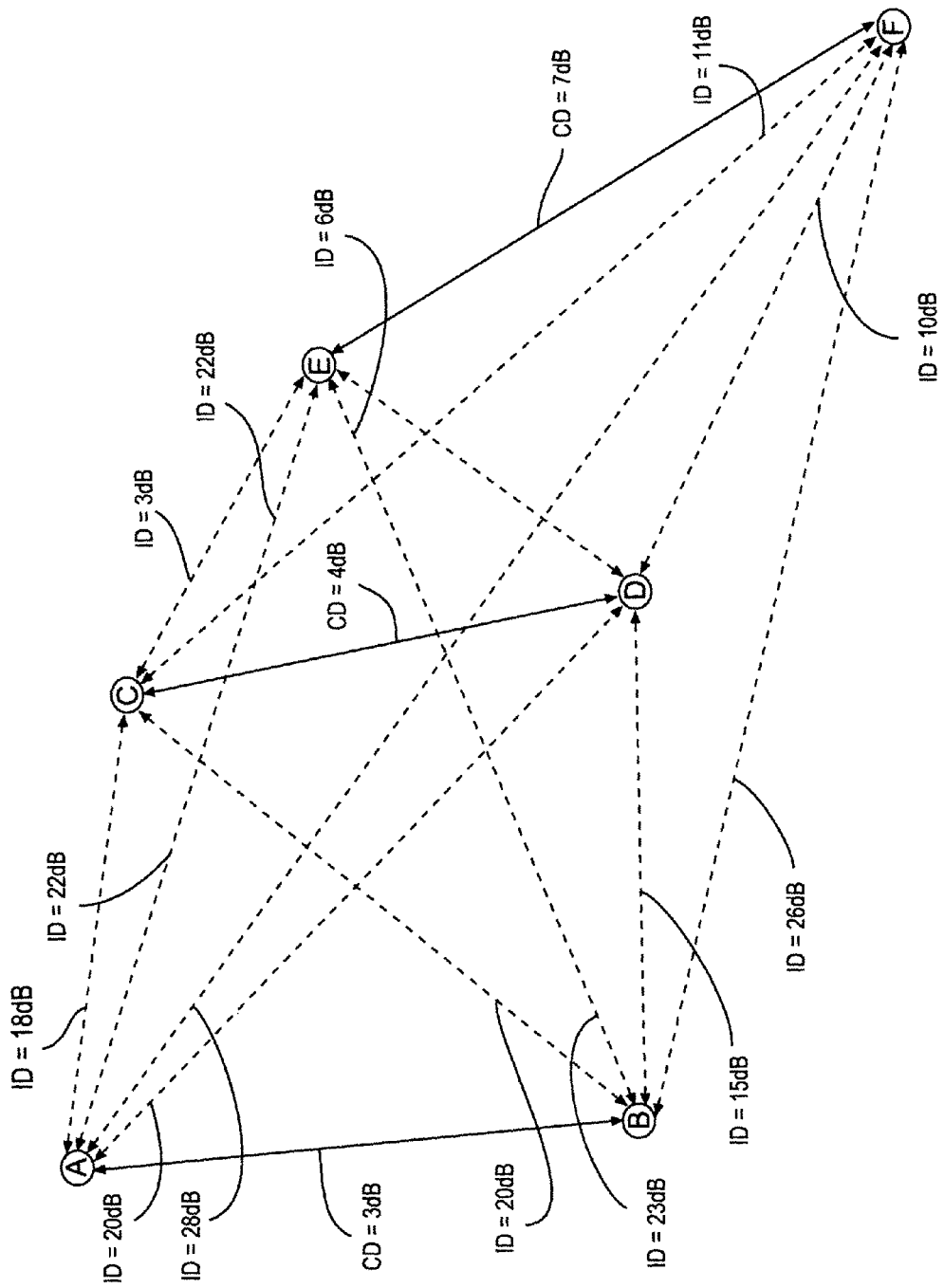
FIG. 10 is a block diagram of the fourth configuration of a power line network shown in FIG. 9 that additionally includes network communication parameters.

FIG. 10 provides exemplary interference distances (ID's) and communications distances (CD's) for the nodes A-F. Selected ICR's for the parameters shown in FIG. 10 are:

$ICR_{AB}$(with respect to transmissions from "is"=node C)=18−3=+15 dB, $ICR_{AB}$(with respect to transmissions from "is"=node E)=22−3=+19 dB, $ICR_{BA}$(with respect to transmissions from "is"=node C)=15−3=+12 dB, $ICR_{BA}$(with respect to transmissions from "is"=node F)=26−3=+9 dB, $ICR_{CD}$(with respect to transmissions from "is"=node A)=18−4=+14 dB, $ICR_{CD}$(with respect to transmissions from "is"=node E)=3−4=−1 dB, $ICR_{DC}$(with respect to transmissions from "is"=node B)=15−4=+11 dB, $ICR_{DC}$(with respect to transmissions from "is"=node E)=6−4=+2 dB, $ICR_{EF}$(with respect to transmissions from "is"=node C)=3−7=−4 dB, $ICR_{EF}$(with respect to transmissions from "is"=node A)=22−7=+15 dB, $ICR_{FE}$(with respect to transmissions from "is"=node B)=26−7=+19 dB, and $ICR_{FE}$(with respect to transmissions from "is"=node D)=10−7=+3 dB, The power margins (PM) for the nodes A-F determine which nodes must join together as a single channel sharing network. Assuming, e.g., a power reduction in Data mode for the link EF of 3 dB, an HSNR of 3 dB, and no power reductions for Data mode communications within the remaining nodes (see equation 6), the following power margins are negative in this example:

$PM_{CD}$(with respect to transmissions from "is"=node E)=−1−3−3=−7 dB, $PM_{DC}$(with respect to transmissions from "is"=node E)=+2−3−3=−4 dB, $PM_{EF}$(with respect to transmissions from "is"=node C)=−4−3−3=−10 dB, and $PM_{FE}$(with respect to transmissions from "is"=node D)=+3−3−3=−3 dB.

Therefore, it can be seen that the newly established link EF must join the channel sharing network of the link CD. The resulting sub-networks are shown in FIG. 9. After links CD and EF are joined, the power of each node is preferably adjusted according to step 65 and this produces new values for the ICR's, which iteratively may impact network partitioning with respect to the other nodes of the network.

Preferably, no link may be a member of more than one channel sharing sub-network. The links AB and the links EF in this example may operate independently if neither node C nor D is active. When link CD begins a Link Setup Control Sequence and calculates its power margins, it becomes clear that node C must include node B in its channel sharing sub-network. Further, node D must include node E in its channel sharing sub-network. Because node B is part of an active link AB and because a link may be part of only one channel sharing sub-network, node A must be included in C's channel sharing sub-network. Similarly, because node E is part of an active link EF, node F must be included in D's channel sharing sub-network. The rule that no link may be a member of more than one channel sharing sub-network forces nodes C, B, and A to join nodes D, E and F. Again, in that case, the power levels are preferably increased so that each node is enabled to detect each other nodes' carriers.

Since the Link Setup Control Sequence imposes overhead on the network, it is best where sessions are long relative to setup times, and therefore that sessions are long relative to the frequency with which the nodes are moved. Therefore, the invention provides greatest advantage in applications transmitting voice, audio, graphics, and video data as opposed to short email messages or control information.

Once a network is partitioned into multiple channel sharing sub-networks according to the SDMA principles of the present invention, control packets within a sub-network not affecting the partitioning may be sent at reduced power to prevent collisions with other channel sharing sub-networks. On the other hand, when a node needs to transmit control information to all of the sub-networks or potential sub-networks, the initial control packet may collide with transmissions on another sub-network. But these collisions are relatively infrequent and do not significantly detract from the added throughput provided by automatically controlling power and data rate to optimize network performance according to the present invention.

It is to be recognized that relatively simple examples of preferred methods and apparatus according to the present invention have been shown and described to facilitate understanding of principles thereof. Other methods and apparatus incorporating selected features may be employed without departing from the principles of the invention. For example, the foregoing methods may be implemented in hardware or software that is either centralized or distributed, or any combination thereof. As another example, the methods may also be used by a broadcasting source to assign the node with the worst ICR as best proxy to acknowledge broadcast messages, allowing efficient broadcast operation while still ensuring that all nodes receive the transmission.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for dynamically reconfiguring a broadcast power line network having at least four nodes, comprising the step of:

spatially dividing, by a hardware CPU, said network into at least two sub-networks, wherein the broadcast power line network comprises at least four nodes, wherein each node is initially configured to be in direct communication with each other node, wherein at least two of said nodes share one of said sub-networks and at least two other of said nodes shares another one of said sub-networks, and wherein spatially dividing comprises:

using at least one interference distance and at least one communications distance, wherein the at least one interference distance is a difference between a transmitted signal power at an interfering source node and a received signal power at a destination node, and wherein the at least one communications distance is a difference between a transmitted power from a source node and a received power at the destination node, the interfering source node being different than the source node;

determining a difference between the at least one interference distance and the at least one communications distance;

comparing the difference between the at least one interference distance and the at least one communications distance with a signal-to-noise ratio;

calculating a power margin by using the difference between the at least one interference distance and the at least one communications distance and a minimum signal-to-noise ratio;

determining a throughput of: (a) a first signal transmitted on a second sub-network at a first maximum power and a first data rate simultaneously with a second signal transmitted on a first sub-network at a second maximum power and a second data rate;

determining a throughput of: (b) said first signal transmitted at a power greater than said first maximum power and said second signal transmitted at a power greater than said second maximum power, said first and second signals sharing a single sub-network; and causing, if throughput (b) exceeds throughput (a), said nodes to share said single sub-network.

2. The method of claim 1, wherein said step of spatially dividing results from determining that a data rate of said at least two sub-networks is greater than a data rate of said network before said step of spatially dividing.

3. A computer node comprising:
memory; and a reconfiguration processor for dynamically reconfiguring a broadcast power line network having at least four nodes, wherein each node is initially configured to be in direct communication with each other node, wherein said processor is coupled to the memory and wherein said processor is capable of executing executable instructions to spatially divide said network into at least two sub-networks, wherein at least two of said nodes share one of said sub-networks and another one of said nodes shares another one of said sub-networks, and wherein spatially dividing comprises:
- using at least one interference distance and at least one communications distance, wherein the at least one interference distance is a difference between a transmitted signal power at an interfering source node and a received signal power at a destination node, and wherein the at least one communications distance is a difference between a transmitted power from a source node and a received power at the destination node, the interfering source node being different than the source node;
- determining a difference between the at least one interference distance and the at least one communications distance;
- comparing the difference between the at least one interference distance and the at least one communications distance with a signal-to-noise ratio;
- calculating a power margin by using the difference between the at least one interference distance and the at least one communications distance and a minimum signal-to-noise ratio;
- determining a throughput of: (a) a first signal transmitted on a second sub-network at a first maximum power and a first data rate simultaneously with a second signal transmitted on a first sub-network at a second maximum power and a second data rate;
- determining a throughput of: (b) said first signal transmitted at a power greater than said first maximum power and said second signal transmitted at a power greater than said second maximum power, said first and second signals sharing a single sub-network; and
- causing, if throughput (b) exceeds throughput (a), said nodes to share said single sub-network.

4. A dynamically reconfigurable broadcast power line network comprising at least four nodes having respective transmitters and receivers for transmitting and receiving respective signals to and from one another, the signals generally sharing a same frequency band and temporal period, and a reconfiguration processor in electronic communication with memory, wherein the processor:
- determines whether a first maximum power can be found at which a first node can transmit a first signal that provides a minimum signal-to-noise ratio at a second node without exceeding a maximum signal-to-noise ratio at a third node and whether a second maximum power can be found at which a fourth node can transmit a second signal that provides a minimum signal-to-noise ratio at said third node without exceeding a maximum signal-to-noise ratio at at least one of said first and second nodes;
- causes, if said first maximum power and said second maximum power cannot be found, said first, second, third and fourth nodes to share a single sub-network, wherein the dynamically reconfigurable network is a wired network, wherein the broadcast power line network comprises at least four nodes, wherein each node is initially configured to be in direct communication with each other node, and wherein the determination comprises:
  - using at least one interference distance and at least one communications distance, wherein the at least one interference distance is a difference between a transmitted signal power at an interfering source node and a received signal power at a destination node, and wherein the at least one communications distance is a difference between a transmitted power from a source node and a received power at the destination node, the interfering source node being different than the source node;
  - determining a difference between the at least one interference distance and the at least one communications distance;
  - comparing the difference between the at least one interference distance and the at least one communications distance with a signal-to-noise ratio; and
  - calculating a power margin by using the difference between the at least one interference distance and the at least one communications distance and a minimum signal-to-noise ratio: and
- causes, if said first maximum power and said second maximum power can be found, said third and fourth nodes to share a first sub-network, and said first and second nodes to share a second sub-network that said third node is not permitted to share, and wherein said reconfiguration processor:
  - determines a throughput of: (a) said first signal transmitted on said second sub-network at said first maximum power and a first maximum data rate simultaneously with said second signal transmitted on said first sub-network at said second maximum power and a second maximum data rate;
  - determines a throughput of: (b) said first signal transmitted at a power greater than said first maximum power and said second signal transmitted at a power greater than said second maximum power, said first and second signals sharing a single sub-network; and
  - causes, if throughput (b) exceeds throughput (a), said first and fourth nodes to share said single sub-network.

5. The network of claim 4, wherein, if said first and second maximum power can be found, said reconfiguration processor further:
- determines the first maximum data rate permitted to transmit said first signal with an acceptable quality of service at said second node, said first maximum data rate being based at least in part on said first maximum power; and
- determines the second maximum data rate permitted to transmit said second signal with an acceptable quality of service at said third node, said second maximum data rate being based at least in part on said second maximum power.

6. The network of claim 4, wherein said reconfiguration processor causes said third and fourth nodes to share said first sub-network, and said first and second nodes to share said second sub-network only if throughput (a) exceeds throughput (b).

7. The network of claim 4, wherein said first node includes a first processing circuit coupled to the transmitter thereof to transmit information representing the power at which a high power signal is transmitted from said first node.

8. The network of claim 4, wherein said second node includes a measuring circuit coupled to the receiver thereof to measure the power of a high power signal received by the receiver, and said reconfiguration processor includes a first processing portion for determining a power loss in said high power signal at said second node as a result of propagation of said high power signal from a source to said second node.

9. The network of claim 7, wherein said second node includes a measuring circuit coupled to the receiver thereof to measure the power of said high power signal received by the receiver of said second node, and said reconfiguration processor includes a second processing portion for determining a power loss in said high power signal at said second node as a result of propagation of said high power signal from said first node to said second node.

10. The network of claim 9, wherein said second processing portion further determines a suggested power for said first signal based, at least in part, on said power loss, and said second node is further adapted to transmit information representing said suggested power to at least said first node.

11. The network of claim 10, wherein said second processing portion further determines said suggested power based, at least in part, on said minimum signal-to-noise ratio for said second node.

12. The network of claim 11, wherein said third node includes a measuring circuit coupled to the receiver thereof to measure the power of said high power signal received by the receiver of said third node, and said reconfiguration processor includes a third processing portion for determining a power loss in said high power signal at said third node as a result of propagation of said high power signal from said first node to said third node, wherein said third processing portion is further adapted to determine said suggested power based, at least in part, on said power loss at said third node.

13. The network of claim 12, wherein said third processing portion further determines said suggested power based, at least in part, on said maximum signal-to-noise ratio for said third node.

14. The network of claim 6, wherein said first node includes a first processing circuit coupled to the transmitter thereof to transmit information identifying the power at which a high power signal is transmitted from said first node.

15. The network of claim 14, wherein said second node includes a measuring circuit coupled to the receiver thereof to measure the power of said high power signal received by the receiver of said second node, and said reconfiguration circuit includes a second processing portion for determining a power loss in said high power signal at said second node as a result of propagation of said high power signal from said first node to said second node.

16. The network of claim 15, wherein said second processing portion further determines a suggested power for said first signal based, at least in part, on said power loss, and said second node is further adapted to transmit said suggested power to at least said first node.

17. The network of claim 16, wherein said second processing portion further determines said suggested power based, at least in part, on said minimum signal-to-noise ratio for said second node.

18. The network of claim 17, wherein said third node includes a measuring circuit coupled to the receiver thereof to measure the power of said high power signal received by the receiver of said third node, and said reconfiguration processor includes a third processing portion for determining a power loss in said high power signal at said third node as a result of propagation of said high power signal from said first node to said third node, wherein said third processing portion further determines said suggested power based, at least in part, on said power loss at said third node.

19. The network of claim 18, wherein said third processing portion further determines said suggested power based, at least in part, on said maximum signal-to-noise ratio for said third node.

20. The network of claim 4, wherein each node in the network determines and maintains estimates of the interference and communications distances to all neighboring nodes in the network.

21. The network of claim 20, wherein if the power margin that is calculated is less than zero, transmissions from one node to another node will interfere with transmissions to a from a third node.

22. The network of claim 4, wherein each node can receive a signal transmitted by any other node, and wherein all control information is transmitted at a highest transmit power and a lowest data rate for transmitting the signal that meets a required signal-to-noise ratio for each node.

23. The network of claim 4, wherein the source node sends a control packet to the destination node, and wherein the control packet comprises an amount of data the source node needs to transmit, a quality of service required for the data, the transmitted power being used by the source node for transmitting the control packet, a noise floor for the source node and a minimum signal-to-noise ratio the source node requires for reliable reception.

24. The network of claim 5, wherein the quality of service comprises a reliability, a delay, a jitter and a bandwidth that are minimally acceptable for a particular application.

25. A method for dynamically reconfiguring a broadcast power line network comprising at least four nodes having respective transmitters and receivers for transmitting and receiving respective signals to and from one another, the method comprising the steps of:
determining whether a first maximum power can be found at which a first node can transmit a first signal that provides a minimum signal-to-noise ratio at a second node without exceeding a maximum signal-to-noise ratio at at least a third node and whether a second maximum power can be found at which a fourth node can transmit a second signal that provides a minimum signal-to-noise ratio at said third node without exceeding a maximum signal-to-noise ratio at at least one of said first and second nodes;
causing, if said first maximum power and said second maximum power cannot be found, said first, second, third and fourth nodes to share a single sub-network, wherein the network that is dynamically reconfigured is a wired network, wherein the broadcast power line network comprises at least four nodes, wherein each node is initially configured to be in direct communication with each other node, and wherein the determination comprises:
using at least one interference distance and at least one communications distance, wherein the at least one interference distance is a difference between a transmitted signal power at an interfering source node and a received signal power at a destination node, and wherein the at least one communications distance is a difference between a transmitted power from a source node and a received power at the destination node, the interfering source node being different than the source node;
determining a difference between the at least one interference distance and the at least one communications distance;

comparing the difference between the at least one interference distance and the at least one communications distance with a signal-to-noise ratio; and calculating a power margin by using the difference between the at least one interference distance and the at least one communications distance and a minimum signal-to-noise ratio; and causing, if said first maximum power and said second maximum power can be found, said third and fourth nodes to share a first sub-network, and said first and second nodes to share a second sub-network that said third node is not permitted to share, and wherein the method further comprises:

determining a throughput of: (a) said first signal transmitted on said second sub-network at said first maximum power and a first data rate simultaneously with said second signal transmitted on said first sub-network at said second maximum power and a second data rate;

determining a throughput of: (b) said first signal transmitted at a power greater than said first maximum power and said second signal transmitted at a power greater than said second maximum power, said first and second signals sharing a single sub-network; and causing, if throughput (b) exceeds throughput (a), said first and fourth nodes to share said single sub-network.

26. The method of claim 25, wherein if said first and second maximum powers can be found, further comprising the steps of:

determining a first maximum data rate permitted to transmit said first signal with an acceptable quality of service at said second node, said first maximum data rate being based at least in part on said first maximum power; and determining a second maximum data rate permitted to transmit said second signal with an acceptable quality of service at said third node, said second maximum data rate being based at least in part on said second maximum power.

27. The method of claim 25, further comprising causing, if throughput (a) exceeds throughput (b), said first node to transmit said first signal at said first power and first data rate simultaneously with said second signal at said second power and second data rate.

28. The method of claim 25, further comprising transmitting information to at least said second node, the information representing the power at which a high power signal is transmitted from said first node.

29. The method of claim 25, further comprising receiving at said second node a high power signal, measuring the power of the high power signal as received by said second node, and determining a power loss in said high power signal at said second node as a result of propagation of said high power signal from a source to said second node.

30. The method of claim 28, further comprising transmitting a high power signal from said first node, receiving said high power signal at said second node, measuring the power of said high power signal as received by said second node, and determining a power loss in said high power signal at said second node as a result of propagation of said high power signal from said first node to said second node.

31. The method of claim 30, further comprising determining a suggested power for said first signal based, at least in part, on said power loss, and transmitting information representing said suggested power to at least said first node.

32. The method of claim 31, further comprising determining said suggested power based, at least in part, on said minimum signal-to-noise ratio for said second node.

33. The method of claim 31, further comprising receiving said high power signal at said third node, measuring the power of said high power signal as received by said third node, determining a power loss in said high power signal at said third node as a result of propagation of said high power signal from said first node to said third node, and determining said suggested power based, at least in part, on said power loss at said third node.

34. The method of claim 33, further comprising determining said suggested power based, at least in part, on said maximum signal-to-noise ratio for said third node.

35. The method of claim 27, further comprising transmitting information to at least said second node, the information representing the power at which a high power signal is transmitted from said first node.

36. The method of claim 35, further comprising transmitting a high power signal from said first node, receiving said high power signal at said second node, measuring the power of said high power signal as received by said second node, and determining a power loss in said high power signal at said second node as a result of propagation of said high power signal from said first node to said second node.

37. The method of claim 36, further comprising determining a suggested power for said first signal based, at least in part, on said power loss, and transmitting said suggested power to at least said first node.

38. The method of claim 37, further comprising determining said suggested power based, at least in part, on said minimum signal-to-noise ratio for said second node.

39. The method of claim 37, further comprising receiving said high power signal at said third node, measuring the power of said high power signal as received by said third node, determining a power loss in said high power signal at said third node as a result of propagation of said high power signal from said first node to said third node, and determining said suggested power based, at least in part, on said power loss at said third node.

40. The method of claim 39, further comprising determining said suggested power based, at least in part, on said maximum signal-to-noise ratio for said third node.

* * * * *